Aug. 28, 1956    L. C. PETERSON ET AL    2,760,542
INNER TUBE
Filed March 23, 1954

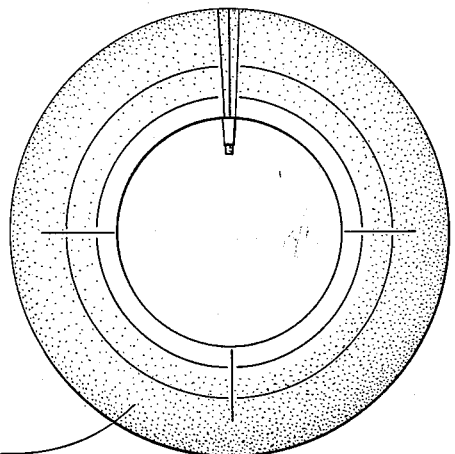

COATING OF FLEXIBLE, NON-TACKY, FILM FORMING THERMOPLASTIC RESIN THAT IS FIRM AT ROOM TEMPERATURE BUT CAPABLE OF SOFTENING AT TIRE OPERATING TEMPERATURES SUFFICIENTLY TO UNDERGO SLIGHT PLASTIC FLOW UNDER THE INFLUENCE OF INFLATION PRESSURES

INVENTORS
LESTER C. PETERSON
FRANCIS A. MULBARGER
HARVEY J. BATTS
BY James J. Long
AGENT United States Patent Office 2,760,542
Patented Aug. 28, 1956

2,760,542
INNER TUBE

Lester C. Peterson, Francis A. Mulbarger, and Harvey J. Batts, Indianapolis, Ind., assignors to United States Rubber Company, New York, N. Y., a corporation of New Jersey Application March 23, 1954, Serial No. 421,508

4 Claims. (Cl. 152—351)

This invention relates to coated inner tubes for pneumatic tires, and more particularly it relates to inner tubes provided with a surface coating that protects the tubes from failure by low-temperature buckling.

Inner tubes, especially those made of Butyl rubber, are subject in sub-zero weather to a type of failure known as buckling. Buckling is a consequence of the fact that at low temperatures elastomers such as Butyl rubber retract only very sluggishly after being stretched. Because of the failure of the elastomeric material to recover rapidly, there is developed a sub-permanent set in the inner tube, which is accumulated until actual folds or buckles are produced. These folds or buckles continually move as the tire rotates, and this movement results in chafing and eventual failure of the tube. The low temperature buckling problem is described in the article "Utilization of Butyl rubber in automotive inner tubes" by Buckley et al., Industrial and Engineering Chemistry, vol. 42, No. 12, page 2407 (December 1950).

Accordingly, a principal object of the present invention is to provide a Butyl rubber inner tube which is not prone to failure by buckling at low temperatures.

Another object is to provide a coated inner tube of good appearance.

Still another object of the invention is the provision of an inner tube having a finish that can be applied economically and conveniently in the factory.

It is still a further object to provide a factory coated inner tube that has a non-tacky surface, and can therefore be handled and packaged without picking up dirt or sticking to itself or to objects with which it comes into contact.

The manner in which the invention realizes the foregoing objects, as well as additional objects and advantages, will be made apparent in the following detailed description, which is intended to be read in conjunction with the accompanying drawing, wherein the single figure depicts a coated inner tube of the invention, in a side elevational view.

The invention contemplates provision of an inner tube, particularly an inner tube made of Butyl rubber, having on its external surface a thin, uniform adherent coating of a flexible, film-forming non-tacky thermoplastic resin that is firm at room temperature, but is capable, at the temperatures existing at the interface of the tube and tire casing in use, of softening sufficiently to flow or deform slightly under the influence of the pressure exerted against the tube and casing by the air contained within the tube. It has been found by actual test that an inner tube bearing such a thermoplastic coating does not fail by buckling when used under conditions that would ordinarily produce such failure in an identical inner tube having no such coating. Apparently the thermoplastic coating prevents buckling by deforming or flowing, under the conditions of temperature and pressure existing within the tire, into the slight depressions or corrugations that normally exist on the inner surface of a tire casing, due to the fact that the textile cords of the inner or band ply of the tire carcass produce barely perceptible protrusions in the surface of the thin layer of rubber carcass stock that covers such cords. While it is not desired to restrict the invention to any particular theory of operation, it appears that the thermoplastic coating, by entering into the surface irregularities of the casing produced by the carcass cords, prevents accumulation of sub-permanent set, such as ordinarily results in a buckling failure. In effect, the thermoplastic coating therefore overcomes the tendency to sluggish retraction of the inner tube within the assembly.

In the particularly preferred practice of the invention, an acrylic resin, particularly a thermoplastic resinous polymeric alkyl acrylate or alkacrylate, in which the alkyl groups are lower alkyl groups typically containing 8 carbon atoms or less, is applied to the surface of a completed Butyl rubber inner tube as a solution or dispersion in any convenient manner, and after evaporation of the liquid from such solution or dispersion there remains on the inner tube surface a thermoplastic film that is unusually effective in preventing low temperature buckling. The resins of this class are represented by polymers of ethyl acrylate, or methyl methacrylate or ethacrylate, and they are known materials. Several such acrylic resins are available commercially in the form of such preparations as those sold under the trade names Acryloid and Rhoplex. Antibuckling coatings based on such resins may be applied to the inner tube conveniently and economically in the factory and they are capable of imparting an unusually clean and attractive appearance, that enhances the saleability of the tube by imparting a favorable impression of good quality and workmanship. Such a coating in no way interferes with the handling or packaging of the tube, since the coating is non-tacky and will not pick up dirt, nor will the tube stick to itself or to its package. Neither does the coating interfere in any way with mounting or dismounting of the tube in the tire casing, since the final coating is non-tacky and is not even mildly adhesive. The coating is flexible and extensible, and does not interfere with flexing and expansion of the inner tube, nor does it tend to come off as the inner tube is flexed or stretched.

The following example, in which all parts are expressed by weight, will serve to illustrate the practice of the invention in more detail.

*Example*

In this example, the acrylic resin employed as the essential ingredient of the inner tube coating was provided in the form of a commercial preparation sold under the trade name Rhoplex AC-33, which is an emulsion containing 46% solids, believed to be comprised principally of ethyl acrylate polymer. The acrylic resin emulsion was mixed with a previously prepared emulsion of wax, of the following composition:

| | Parts |
|---|---|
| Wax | 9.00 |
| Tackifying agent | 2.00 |
| Emulsifier | 3.00 |
| Water | 88.00 |
| | 102.00 |

The wax is included in the formulation to prevent buckling and is suitably a hard wax such as carnauba wax or its known equivalents or substitutes, such as the synthetic wax known as Gersthofen wax, or a mixture thereof. The wax is generally employed in amount of from about 2 to 8 parts, in 10 parts of acrylic resin solids. The tackifying agent is employed to insure better adhesion of the acrylic resin to the inner tube, and it is generally employed in amount of from 0.5 to 2 parts in 10 parts of the acrylic resin solids, and in such amounts there is no danger that the final coating will be undesirably tacky. Conventional tackifying agents may be used for this purpose, among which may be mentioned such tacky resins as manila resin, phenolic resins such as those sold under such trade names as Amberol 750 or Amberol 820, or shellac, or their known equivalents. The preliminary wax emulsion was mixed with the acrylic resin emulsion according to the following formula:

| | Parts |
|---|---|
| Acrylic resin emulsion | 27.00 |
| Wax emulsion | 50.00 |
| Water | 23.00 |
| | 100.00 |

This emulsion was sprayed onto the surface of a Butyl rubber inner tube, and allowed to dry at room temperature. The coating had a luster and a good feel to the hand, and it was not tacky or adhesive, and therefore it did not attract or hold dirt, dust, or lint, nor did it adhere to itself or to the container in which it was packaged. The thus-coated inner tube was mounted in a tire casing, and run under conditions that would ordinarily produce a buckling failure. The tube did not fail, indicating that buckling was prevented, evidently by the fact that the 150°–250° F. temperature existing within the assembly under operating conditions produced sufficient softening of the acrylic resin coating to permit the coating, under the influence of the inflation pressure, to take the contour of the surface irregularities of the interior of the casing, so that accumulation of sub-permanent set due to sluggish retraction was prevented.

After the thus-coated tube had been used in the tire casing for a period of time, the tube was removed from the casing and it was observed that the anti-buckling coating was still intact on the surface of the tube. The tube was inserted in another tire casing, and it was still resistant to buckling. This indicates that the coating remains on the surface of the tube, and does not stick to the tire casing. This also emphasizes that adhesion of the tube to the casing is in no way involved.

The term "Butyl rubber" is used herein in its ordinary sense to denote that type of synthetic rubber obtained by low temperature copolymerization of an isoolefin, typically one having from 4 to 7 carbon atoms, such as isobutylene with a small amount, such as 0.5 to 10%, of a conjugated aliphatic diolefin, typically one having from 4 to 6 carbon atoms, such as isoprene or butadiene. The ordinary Butyl rubber of commerce is the isobutylene: isoprene copolymer, and this is the preferred material of which the present inner tube is made.

Having thus described our invention, what we claim and desire to protect by Letters Patent is:

1. An inner tube comprising a synthetic rubbery copolymer of an isoolefin having from 4 to 7 carbon atoms with from 0.5 to 10% of an aliphatic conjugated diolefin having from 4 to 6 carbon atoms, coated with a thin film of a composition comprising a flexible, adherent, non-tacky, film-forming, thermoplastic acrylic resin, selected from the group consisting of lower alkyl acrylate polymers and lower alkyl alkacrylate polymers, that is firm at ordinary temperatures, but softens sufficiently at temperatures of 150–250° F. to flow under the influence of normal inflation pressures into irregularities existing on the interior surface of a tire casing in which the tube is mounted, whereby failure of the inner tube from low temperature buckling is prevented, the said composition containing 10 parts of the said resin, from 2 to 8 parts of wax, and from 0.5 to 2 parts of a tackifying agent.

2. An inner tube comprising a synthetic rubbery copolymer of an isoolefin having from 4 to 7 carbon atoms with from 0.5 to 10% of an aliphatic conjugated diolefin having from 4 to 6 carbon atoms, surfaced with a thin anti-buckling film comprising 10 parts of a thermoplastic resin selected from the group consisting of lower alkyl acrylate polymers and lower alkyl alkacrylate polymers, from 2 to 8 parts of wax, and from 0.5 to 2 parts of a tackifying agent.

3. An inner tube as in claim 2, in which the said thermoplastic resin is a lower alkyl acrylate polymer, said coating being firm at ordinary temperatures, but softening sufficiently at temperatures of 150–250° F. to flow under the influence of inflation pressures into irregularities existing on the interior surface of a tire casing in which the tube is mounted, whereby failure of the inner tube from low temperature buckling is prevented.

4. An inner tube as in claim 3, in which the said thermoplastic resin is ethyl acrylate polymer.

References Cited in the file of this patent

UNITED STATES PATENTS

| 2,232,595 | Dittman et al. | Feb. 18, 1941 |
| 2,428,478 | Thurber | Oct. 7, 1947 |
| 2,566,384 | Tilton | Sept. 4, 1951 |
| 2,611,153 | Semegen | Sept. 23, 1952 |
| 2,617,788 | Schaffel et al. | Nov. 11, 1952 |
| 2,692,000 | Peterson et al. | Oct. 19, 1954 |